US011093352B2

(12) United States Patent
Bannur Subraya et al.

(10) Patent No.: US 11,093,352 B2
(45) Date of Patent: Aug. 17, 2021

(54) FAULT MANAGEMENT IN NVME SYSTEMS

(71) Applicant: HEWLETT PACKARD ENTERPRISE DEVELOPMENT LP, Houston, TX (US)

(72) Inventors: Sumangala Bannur Subraya, Bangalore (IN); Sreenivasa Prasad Vellalore, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 99 days.

(21) Appl. No.: 16/567,807

(22) Filed: Sep. 11, 2019

(65) Prior Publication Data
US 2021/0073086 A1 Mar. 11, 2021

(51) Int. Cl.
G06F 11/20 (2006.01)
G06F 13/16 (2006.01)
(52) U.S. Cl.
CPC ........ G06F 11/201 (2013.01); G06F 13/1668 (2013.01); G06F 2201/805 (2013.01)
(58) Field of Classification Search
CPC .... G06F 11/20; G06F 11/201; G06F 13/1668; G06F 3/06; G06F 9/38
See application file for complete search history.

(56) References Cited

U.S. PATENT DOCUMENTS

| | | | |
|---|---|---|---|
| 9,021,168 B1 | 4/2015 | Horn et al. | |
| 10,387,081 B2* | 8/2019 | Benisty | G06F 13/18 |
| 10,606,516 B2* | 3/2020 | Subraya | G06F 3/0679 |
| 2014/0082263 A1 | 3/2014 | Iwasa et al. | |
| 2015/0304423 A1* | 10/2015 | Satoyama | G06F 13/10 709/223 |
| 2015/0347025 A1* | 12/2015 | Law | G11C 16/16 711/103 |
| 2017/0052912 A1 | 2/2017 | Canepa et al. | |
| 2018/0307521 A1* | 10/2018 | Pinto | G06F 9/546 |
| 2018/0321844 A1* | 11/2018 | Benisty | G06F 13/26 |
| 2018/0321945 A1* | 11/2018 | Benisty | G06F 13/385 |
| 2018/0321987 A1* | 11/2018 | Benisty | G06F 9/528 |
| 2018/0356996 A1* | 12/2018 | Benisty | G06F 3/0653 |
| 2019/0042144 A1* | 2/2019 | Peterson | G06F 3/067 |

(Continued)

FOREIGN PATENT DOCUMENTS

CN 107193761 A 9/2017

OTHER PUBLICATIONS

Srivastava, A., "[SPDK] Namespace Sharing Between Multiple Controller," Mar. 10, 2017, https://lists.01.org/pipermail/spdk/2017-March/000382.html.

(Continued)

*Primary Examiner* — Kamini B Patel
(74) *Attorney, Agent, or Firm* — Hewlett Packard Enterprise Patent Depertment

(57) ABSTRACT

Systems and methods disclosed herein host bus adapter (HBA) drivers to detect when execution of input/output (I/O) commands in urgent-priority queues is being delayed due to processing of I/O commands in lower-priority queues in NVMe subsystems, automatically identify which the lower-priority queue that is causing the delay, and mitigate the delay by throttling and migrating the lower-priority queue to the control of a controller that applies an arbitration mechanism other than weighted round robin.

20 Claims, 5 Drawing Sheets

(56) References Cited

U.S. PATENT DOCUMENTS

2019/0250845 A1\* 8/2019 Kabra ................... G06F 3/0616
2020/0042236 A1\* 2/2020 Subraya ................. G06F 3/061
2021/0004171 A1\* 1/2021 Li ......................... G06F 3/0611

OTHER PUBLICATIONS

Zaitsev, P., "Using NVMe Command Line Tools to Check NVMe Flash Health," Feb. 9, 2017, https://www.percona.com/blog/2017/02/09/using-nvme-command-line-tools-to-check-nyme-flash-health/.

\* cited by examiner

200

202

| Controller ID | Controller Busy Time |
|---|---|
| 001 | 5 |
| 002 | 0 |
| 003 | 1 |
| 004 | 5 |
| 005 | 2 |
| 006 | 4 |
| 007 | 5 |
| 008 | 4 |
| 009 | 4 |
| 010 | 3 |
| 011 | 0 |
| 012 | 3 |
| 013 | 5 |
| 014 | 2 |
| 015 | 5 |
| 016 | 3 |
| 017 | 1 |
| 018 | 2 |
| 019 | 1 |
| 020 | 4 |
| 021 | 1 |
| 022 | 5 |
| 023 | 1 |
| 024 | 3 |
| 025 | 4 |
| 026 | 2 |
| 027 | 4 |
| 028 | 5 |
| 029 | 2 |
| 030 | 1 |
| 031 | 8 |

FIG. 2

FAULT MANAGEMENT IN NVME SYSTEMS

BACKGROUND

Non-Volatile Memory Express (NVMe) is an interface to flash devices. Devices that are compliant with the NVMe specification have very low latency and high bandwidth compared to traditional hard drives. The NVMe specification is an open device interface specification that specifies how host software and hardware communicates with non-volatile memory subsystems (e.g., NAND flash memory in solid-state drives (SSDs)). Compared to prior interface protocols, NVMe reduces Input/Output (I/O) overhead, facilitates parallelization, and reduces latency.

BRIEF DESCRIPTION OF THE DRAWINGS

Various features and advantages of the invention will become apparent from the following description, given by way of example only, which is made with reference to the accompanying drawings.

FIG. 2 illustrates a table of hypothetical controller busy time values that are provided as part of a working example of how one controller busy time might be identified as an outlier, according to one example.

DETAILED DESCRIPTION

Figure 1:
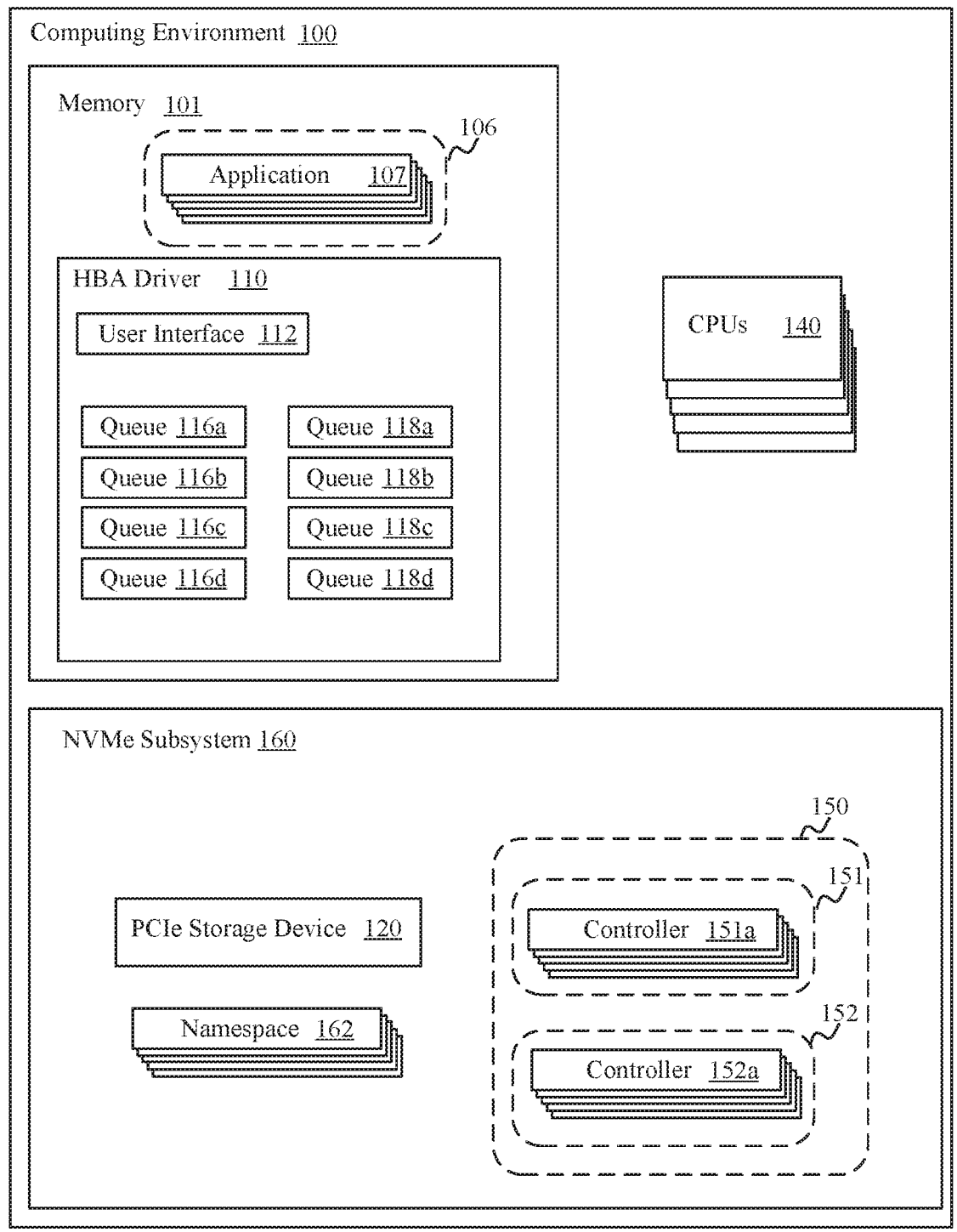
FIG. 1 illustrates computer environment in which technologies described herein may operate, according to one example.

The current NVMe specification (e.g., NVM Express Revision 1.3, which is hereby incorporated by reference) allows submission queues that hold requested I/O commands to have different priority levels (e.g., low, medium, or high). The NVMe specification also describes arbitration mechanisms for deciding the order in which to execute the I/O commands contained in a group of queues. One of these arbitration mechanisms is referred to as weighted round-robin with urgent priority class arbitration.

In the weighted round robin arbitration mechanism, there are three strict priority classes and three weighted round robin priority levels. If a first submission queue is of a higher strict priority than a second submission queue, then all candidate commands in the first submission queue will begin processing before any candidate commands from the second submission queue start processing. The highest strict priority class is the admin class. The next highest strict priority class is the urgent class. The lowest strict priority class is the weighted round robin class.

Within the weighted round robin class, there are three weighted round robin priority levels: low, medium, and high. To determine which I/O commands to process within the weighted round robin levels, a controller will check high-priority submission queues first. The controller will process up to a predefined number of I/O commands from each high-priority submission queue in each round. If I/O commands remain in any of the high-priority queues after a round, the controller will perform another round. If there are no I/O commands remaining in the high-priority submission queues, the controller will perform a round for medium-priority submission queues in a similar manner. Once there are no I/O commands remaining in the high-priority queues or the medium-priority queues, the controller will perform a round for the low-priority submission queues. A configurable arbitration burst setting indicates the predefined number of I/O commands that a controller may launch from a particular submission queue during a single round.

The weighted round-robin arbitration mechanism provides a convenient and useful way to prioritize I/O commands that are found in submission queues that are tagged with different priority levels. However, there are some scenarios in which the weighted round-robin arbitration mechanism can fail to ensure that high-priority I/O commands are processed in a timely fashion. Specifically, some I/O commands take an inordinate amount of time to process (e.g., when a command is large or when I/O routed to a drive is found in scattered or unaligned blocks.) As a result, after a controller commences processing a current I/O command from a low-priority submission queue, but before the controller finishes processing the current I/O command, additional I/O commands may be enqueued into higher-priority submission queues that are handled by the controller. Although they have a higher priority than the current I/O command that the controller is currently processing, those additional I/O commands will not be processed until the controller finishes processing the current I/O command. This causes undue latency for high-priority I/O commands.

Systems and methods disclosed herein address this problem by leveraging namespace sharing and multi-pathing (which are supported in the current NVMe standard). As described below, an NVMe driver can identify a submission queue that is responsible for bloating the busy time for a controller and migrate the responsible submission queue to a controller that applies a different arbitration policy that mitigates the latency caused by the responsible submission queue.

Specifically, for each controller in an NVMe subsystem, the NVMe subsystem reports a "controller busy time" field (which is already defined in the NVMe specification) to an NVMe driver. If the busy time for a controller in the NVMe subsystem is inordinately high relative to the busy times for other controllers that use the same arbitration policy in that same NVMe subsystem, the NVMe driver first checks the arbitration policy for that controller (referred to as the source controller) to determine whether a submission queue of the urgent class is being served by the source controller. If so, the NVMe driver temporarily suspends that submission queue (referred to as the first queue), selects an additional controller in the NVMe subsystem with a lower busy time than the source controller, and creates an additional urgent-priority queue that is to be served by the additional controller.

Next, the NVMe driver registers the new queue with the NVMe subsystem and activates namespace sharing for a namespace that is associated with the source controller such that the additional controller can also handle I/O commands for that namespace. The NVMe driver moves the I/O commands from the first queue to the additional urgent-priority queue and temporarily ensures that subsequent I/O commands for the namespace are not routed to the first queue.

Next, the NVMe driver monitors the controller busy time field for the source controller to determine whether moving the I/O commands to the additional urgent-priority queue reduced the busy time for the source controller. This may be accomplished by sending a Get Log Page command (as described in section 5.14 of NVM Express Revision 1.3) to the firmware for the source controller at regular intervals to obtain the controller busy time field found in the Self-Monitoring, Analysis and Reporting Technology (SMART)/Health Information Log described in section 5.14.1.2 of NVM Express Revision 1.3. If the busy time for the source controller has not decreased, the NVMe driver systematically migrates low-priority submission queues and medium-priority submission queues from the source controller to other controllers in the NVME subsystem until the busy time for the source controller decreases. The submission queue that was most recently migrated before the busy time for the source controller decreased is tagged as the source of the delay. The other submission queues that were migrated, including the first queue, are migrated back to the source controller. However, the queue that caused the delay is not migrated back to the source controller, but is left to be served by a controller that applies an arbitration policy other than the weighted round-robin arbitration mechanism. Once the other queues have been migrated back to the source controller, the NVMe driver deactivates namespace sharing.

FIG. 1 illustrates computing environment 100 in which technologies described herein may operate, according to one example. The computing environment 100 may be, for example, a high-end server or a collection of servers (e.g., in a cloud infrastructure). As shown, the computing environment 100 includes memory 101, one or more central processing units (CPUs) 140, an NVMe subsystem 160, a namespace 162, a Peripheral Component Interconnect Express (PCIe) storage device 120, and device controllers 150. A Host Bus Adapter (HBA) driver 110 executing in the memory 101 manages communications between the PCIe storage device 120 and other elements of the computing environment, such as the CPUs 140. The PCIe storage device 120 and the HBA driver 110 may conform to a current NVMe standard (e.g., NVM Express Revision 1.3 or a later revision). Applications 106 also execute in the memory 101. In one example, the namespace 162 may be associated with one or more of the applications 106.

A user (e.g., a system administrator) may wish for the HBA driver 110 to mitigate latency due to controller busy time automatically. Such a scenario may arise, for example, if I/O commands that originate from the application 107 are taking a long time to process relative to I/O commands that originate from the applications 106 in general.

Through the user interface 112, the user can configure the HBA driver 110 to mitigate latency due to controller busy time in the following manner. In one example, the user can specify a number of submission queues for the HBA driver 110 to assign to a namespace. Mechanisms for assigning priority levels to NVMe namespaces (rather than queues alone) are described in U.S. patent application Ser. No. 16/102,633 ("SYSTEMS AND METHODS FOR I/O PRIORITIZATION IN NVME-COMPLIANT STORAGE DEVICES"), which is hereby incorporated by reference in its entirety. The number of queues per namespace is user configurable. Currently, NVMe includes support for up to 65,535 queues in total. Each submission queue may hold up to a Maximum Queue Entries Supported (MQES) by the device controllers 150 for the PCIe storage device 120.

The HBA driver 110 may poll the NVME subsystem 160 at regular intervals to request the current values of the controller busy time field for each of the controllers 150. The controllers 151 apply the weighted round-robin arbitration mechanism, while the controllers 152 apply other arbitration mechanisms (e.g., round robin that is not weighted). The NVMe subsystem 160 provides the current values to the HBA driver 110 accordingly. Upon receiving the current values, the HBA driver 110 performs an analysis to determine whether any of the current values for the controllers 151 is an outlier.

In this example, suppose the HBA driver identifies the current value for the controller 151a as an outlier. Also suppose that the controller 151a is authorized to manage queues that handle I/O requests associated with the namespace 162. Upon verifying that the controller 151a applies the weighted round robin arbitration mechanism, the HBA driver 110 next determines which of the controllers 152 has the lowest current value of any controller in the controllers 152. In this example, suppose controller 152a has the lowest current value for the controller busy time field. The HBA driver 110 selects the controller 152a and registers a submission queue 118a in the NVMe subsystem 160 for the controller 152a. Controller 152a will manage the queue 118a. The HBA driver 110 tags the queue 118a with the urgent priority level and activates namespace sharing so that the controller 152a can manage I/O requests associated with the namespace 162 (which may be associated with the application 107).

Next, the HBA driver 110 migrates the I/O commands found in the submission queue 116a, which is also tagged with the urgent priority level, to the submission queue 118a. The HBA driver 110 also temporarily prevents additional I/O commands from being added to the queue 116a.

After migrating the contents of the submission queue 116a to the submission queue 118a, the HBA driver 110 polls the NVMe subsystem 160 again. In response, the NVMe subsystem 160 (e.g., including firmware for the controllers 150) provides the latest controller busy time values for the controllers 150. The HBA driver 110 updates the current values to the latest busy time values, then checks the current value for the controller 151a to determine whether migrating the submission queue 116a reduced the busy time down to an acceptable level (e.g., by checking to determine whether the current value for the controller 151a is still an outlier after the update). If the current value for the controller 151a is acceptable, the HBA driver 110 can infer that I/O commands that were migrated from the submission queue 116a were the most likely cause of the outlier that was observed before the migration. Since the queue 116a was tagged as urgent, the controller 151a was not unduly delaying I/O commands in an urgent-priority queue while executing I/O commands in a lower-priority queue. The HBA driver 110 may migrate the I/O commands stored in the queue 118a back to the queue 116a and deactivate namespace sharing.

On the other hand, if the current value for the controller 151a was not sufficiently reduced after the I/O commands in the queue 116a were migrated to the queue 118a, then some other queue that is managed by the controller 151a is the cause of the observed outlier. The HBA driver 110 again selects one of the controllers 152 that has a low current value for the controller busy time field (e.g., the lowest current value after the update.)

In this example, suppose controller 152a is selected again (although a different one of the controllers 152 may be selected in other examples). The HBA driver 110 registers a submission queue 118b in the NVMe subsystem 160 for the controller 152a. Controller 152a will manage the queue 118b. The HBA driver 110 tags the queue 118b with the low priority level.

Next, the HBA driver 110 migrates the I/O commands found in the submission queue 116b, which is also tagged with the low priority level, to the queue 118b. The HBA driver 110 may also temporarily prevent additional I/O commands from being added to the queue 116b.

After migrating the contents of the submission queue 116b to submission queue 118b, the HBA driver 110 polls the NVMe subsystem 160 again. In response, the NVMe subsystem 160 provides the latest controller busy time values for the controllers 150. The HBA driver 110 updates the current values to the latest busy time values, then checks the current value for the controller 151a to determine whether migrating the submission queue 116b reduced the busy time down to an acceptable level (e.g., by checking to determine whether the current value for the controller 151a is still an outlier after the update). If the current value for the controller 151a is acceptable, the HBA driver 110 can infer that I/O commands that were migrated from the submission queue 116b were the most likely cause of the outlier that was observed before the migration. At this point, the HBA driver 110 migrates the I/O commands stored in the queue 118a back to the queue 116a. However, the HBA driver 110 may leave the I/O commands that were migrated from the queue 116b in the queue 118b. This allows the controller 152a, which is applying an arbitration mechanism that is better suited to mitigate delays caused by low-priority I/O commands, to continue handling the I/O commands that caused the observed outlier. In addition, the HBA driver 110 may throttle the queue 118b by decreasing the arbitration burst setting for the queue 118b so that the controller 152a will process I/O commands from the queue 118b at a reduced rate relative to I/O commands in other queues managed by the controller 152a.

However, if the current value for the controller 151a was still not sufficiently reduced after the I/O commands in the queue 116b were migrated to the queue 118b, then some other queue that is managed by the controller 151a is likely the cause of the observed outlier. The HBA driver 110 again selects one of the controllers 152 that has a low current value for the controller busy time field (e.g., the lowest current value after the latest update.)

In this example, suppose controller 152a is selected again (although a different one of the controllers 152 may be selected in other examples). The HBA driver 110 registers a submission queue 118c in the NVMe subsystem 160 for the controller 152a. Controller 152a will manage the queue 118c. The HBA driver 110 tags the queue 118c with the medium priority level.

Next, the HBA driver 110 migrates the I/O commands found in the submission queue 116c, which is also tagged with the low priority level, to the submission queue 118c. The HBA driver 110 may also temporarily prevent additional I/O commands from being added to the queue 116c.

After migrating the contents of the submission queue 116c to the submission queue 118c, the HBA driver 110 polls the NVMe subsystem 160 again. In response, the NVMe subsystem 160 provides the latest controller busy time values for the controllers 150. The HBA driver 110 updates the current values to the latest busy time values, then checks the current value for the controller 151a to determine whether migrating the submission queue 116c reduced the busy time down to an acceptable level. If the current value for the controller 151a is acceptable, the HBA driver 110 can infer that I/O commands that were migrated from the submission queue 116c were the most likely cause of the outlier that was observed before the migration. At this point, the HBA driver 110 migrates the I/O commands stored in the queue 118a back to the queue 116a. Similarly, the HBA driver 110 migrates the I/O commands stored in the queue 118b back to the queue 116b. However, the HBA driver 110 may leave the I/O commands that were migrated from the queue 116c in the queue 118c. Again, the controller 152a may be applying an arbitration mechanism that is better suited to mitigate delays caused by low-priority I/O commands. In addition, the HBA driver 110 may throttle the queue 118c by decreasing the arbitration burst setting for the queue 118c so that the controller 152a will process I/O commands from the queue 118c at a reduced rate relative to I/O commands in other queues managed by the controller 152a.

On the other hand, if the current value for the controller 151a was still not sufficiently reduced after the I/O commands in the queue 116c were migrated to the queue 118c, then a different queue that is managed by the controller 151a is likely the cause of the observed outlier. The HBA driver 110 again selects one of the controllers 152 that has a low current value for the controller busy time field (e.g., the lowest current value after the latest update.)

In this example, suppose controller 152a is selected again (although a different one of the controllers 152 may be selected in other examples). The HBA driver 110 registers a submission queue 118d in the NVMe subsystem 160 for the controller 152a. Controller 152a will manage the queue 118d. The HBA driver 110 tags the queue 118d with the high priority level.

Next, the HBA driver 110 migrates the I/O commands found in the submission queue 116d, which is also tagged with the low priority level, to the queue 118d. The HBA driver 110 may also temporarily prevent additional I/O commands from being added to the queue 116d.

After migrating the contents of the submission queue 116d to the submission queue 118d, the HBA driver 110 polls the NVMe subsystem 160 again. In response, the NVMe subsystem 160 provides the latest controller busy time values for the controllers 150. The HBA driver 110 updates the current values to the latest busy time values, then checks the current value for the controller 151a to determine whether migrating the submission queue 116d reduced the busy time down to an acceptable level.

If the current value for the controller 151a is acceptable, the HBA driver 110 can infer that I/O commands that were migrated from the submission queue 116d were the most likely cause of the outlier that was observed before the migration. The HBA driver 110 migrates the I/O commands stored in the queue 118a back to the queue 116a. Similarly, the HBA driver 110 migrates the I/O commands stored in the queue 118b back to the queue 116b. The HBA driver 110 also migrates the I/O commands stored in the queue 118c back to the queue 116c. However, the HBA driver 110 may leave the I/O commands that were migrated from the queue 116d in the queue 118d. In addition, the HBA driver 110 may throttle the queue 118d by decreasing the arbitration burst setting for the queue 118d so that the controller 152a will process I/O commands from the queue 118d at a reduced rate relative to I/O commands in other queues managed by the controller 152a. However, since high-priority queues may be tagged for less latency by the applications 106, it may be preferable not to throttle the queue 118d in some examples.

FIG. 2 illustrates a table 200 of hypothetical controller busy time values that are provided as part of a working example of how one controller busy time might be identified as an outlier, according to one example.

As shown, the table 200 includes columns with the headers "Controller ID" and "Controller Busy Time" in a header row 202. Each of the rows below is an entry that shows the value of the controller busy time for a particular controller.

For the purposes of this example, suppose that each of the controllers for which an entry is found in table 200 applies the weighted round robin arbitration mechanism. In order to determine whether there are any outliers, an HBA driver can calculate the first quartile, the second quartile (i.e., median), the third quartile, and the fourth quartile for the controller busy time values shown in table 200. Next, the HBA driver can determine the interquartile range by subtracting the first quartile from the third quartile. Next, the HBA driver multiplies the interquartile range by 1.5 to determine a product. The product is added to the third quartile to determine a sum. Any controller busy time value that is greater than the sum can be considered an outlier.

Figure 3:
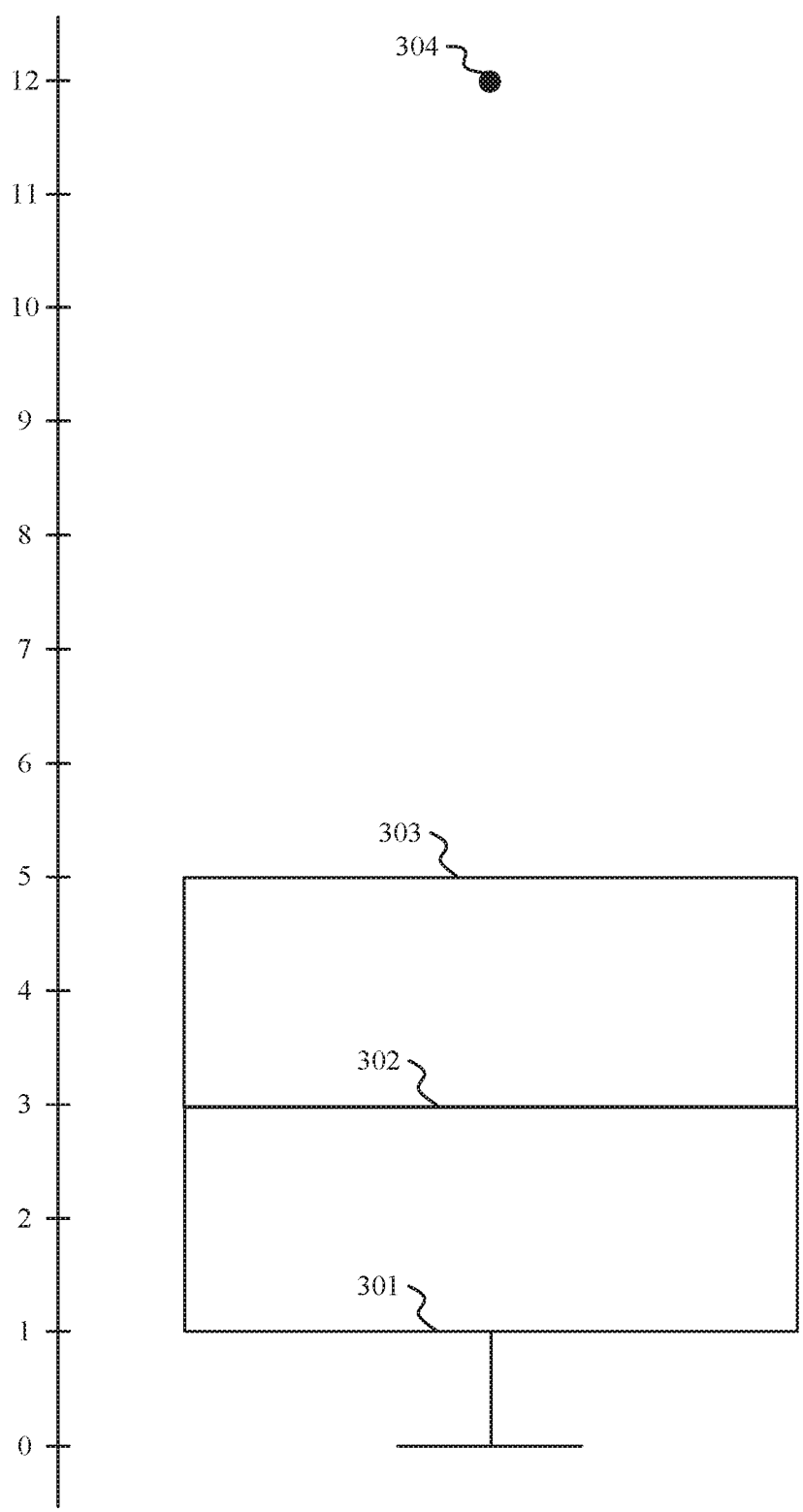
FIG. 3 is a boxplot generated for the hypothetical controller busy time values shown in FIG. 2, according to one example.

FIG. 3 is a boxplot 300 generated for the hypothetical controller busy time values shown in FIG. 2, according to one example. As shown, the first quartile 301 is one, the second quartile (median) 302 is three, and the third quartile 303 is five. Thus, the interquartile range is four (i.e., five minus one).

The interquartile range multiplied by 1.5 is six. Six plus five (the third quartile) is eleven. There is one value found in the table 200 from FIG. 2 that exceeds eleven: twelve. Thus, the controller that is tagged with the controller ID 031 (see table 200 from FIG. 2) is an outlier 304. Therefore, in this example, an HBA driver would trigger the methods described herein to reduce the controller busy time for that controller once the outlier value was identified.

Figure 4:
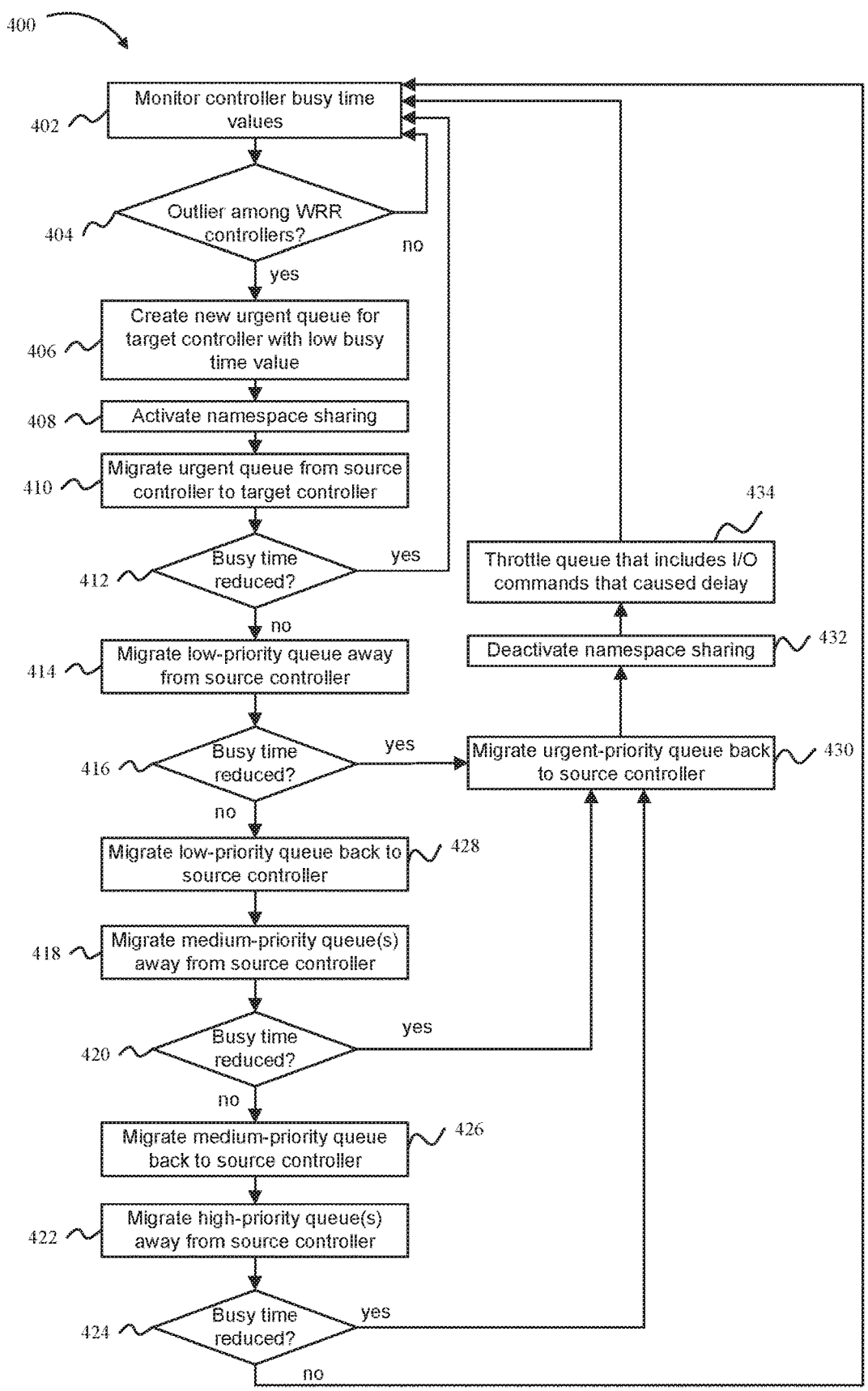
FIG. 4 is a diagram that illustrates how an HBA driver may apply methods described herein, according to one example.

FIG. 4 is a diagram 400 that illustrates how an HBA driver may apply methods described herein, according to one example. As show in block 402, the HBA driver monitors controller busy time values for controllers in an NVMe subsystem. The monitoring may be achieved by polling the NVMe subsystem for updated busy time values at regular intervals. At block 404, the HBA driver determines whether there is a current controller busy time value that is an outlier relative to the distribution of current busy time values for controllers in the subsystem that are applying the weighted round robin arbitration scheme. If no outlier is detected, the monitoring described in block 402 continues. However, if outlier is detected, the flow of the diagram 400 proceeds to block 406. The controller that currently has the outlier value can be referred to as the source controller.

At block 406, the HBA driver creates a new urgent-priority queue to be managed by a controller whose current busy time value is low (e.g., lowest) or that has fewer queues than the source controller and does not have arbitration policy set. This controller that manages the new urgent-priority queue can be referred to as the target controller. The target controller applies an arbitration mechanism other than weighted round robin.

At block 408, the HBA driver activates namespace sharing. (Note that block 408 may be executed before, or concurrently with, block 406 in some examples.) At block 410, the HBA driver migrates the I/O commands found in an urgent-level queue managed by the source controller to the urgent-level queue managed by the target controller.

At block 412, the HBA driver updates the controller busy time values for the controllers in the NVMe subsystem and determines whether the busy time value for the source controller has decreased (e.g., to the point of no longer being an outlier). If the busy time value for the source controller has sufficiently decreased, the flow of diagram 400 returns to block 402. Otherwise, the flow of diagram 400 proceeds to block 414.

At block 414, the HBA driver creates a new low-priority queue to be managed by the target controller (or an additional target controller) and migrates the I/O commands found in a low-priority queue managed by the source controller to the new low-priority queue.

At block 416, the HBA driver again updates the controller busy time values for the controllers in the NVMe subsystem and determines whether the busy time value for the source controller has decreased (e.g., to the point of no longer being an outlier). If the busy time value for the source controller has sufficiently decreased, the flow of diagram 400 proceeds to block 430. Otherwise, the flow of diagram 400 proceeds to block 428.

At block 428, the HBA driver migrates the I/O commands that were migrated in block 414 back to the low-priority queue managed by the source controller. The flow of diagram 400 than proceeds to block 418.

At block 418, the HBA driver creates a new medium-priority queue to be managed by the target controller (or an additional target controller) and migrates the I/O commands found in a medium-priority queue managed by the source controller to the new medium-priority queue.

At block 420, the HBA driver again updates the controller busy time values for the controllers in the NVMe subsystem and determines whether the busy time value for the source controller has decreased (e.g., to the point of no longer being an outlier). If the busy time value for the source controller has sufficiently decreased, the flow of diagram 400 proceeds to block 430. Otherwise, the flow of diagram 400 proceeds to block 426.

At block 426, the HBA driver migrates the I/O commands that were migrated in block 418 back to the medium-priority queue managed by the source controller. The flow of diagram 400 then proceeds to block 422.

At block 422, the HBA driver creates a new high-priority queue to be managed by the target controller (or an additional target controller) and migrates the I/O commands found in a high-priority queue managed by the source controller to the new high-priority queue.

At block 424, the HBA driver again updates the controller busy time values for the controllers in the NVMe subsystem and determines whether the busy time value for the source controller has decreased (e.g., to the point of no longer being an outlier). If the busy time value for the source controller has sufficiently decreased, the flow of diagram 400 proceeds to block 430. Otherwise, the flow of diagram 400 proceeds to block 402 because the HBA driver could not determine which queue caused the observed outlier.

Similarly, at block 430, the HBA driver migrates the I/O commands that were migrated in block 410 back to the urgent-priority queue managed by the source controller.

At block 432, the HBA driver deactivates namespace sharing. Also, in block 434, the HBA driver throttles the queue that includes I/O commands that were inferred to be the cause of the observed outlier. For example, if the busy time was reduced at block 416, the HBA driver throttles the low-priority queue managed by the target controller. Similarly, if the busy time was reduced at block 420, the HBA driver throttles the medium-priority queue managed by the target controller. If the busy time was reduced at block 424, the HBA driver throttles the high-priority queue managed by the target controller (note that, in other examples, in order to avoid increasing latency, the high-priority queue is not throttled). Throttling may be accomplished by decreasing an arbitration burst value that applies to the queue that is to be throttled.

Also note that, in one alternative example, the flow of diagram 400 may proceed directly from block 416 to block 418 if the busy time is not reduced by the migration of the low-priority queue. Similarly, if the busy time is not reduced by the migration of the medium-priority queue, the flow of diagram 400 may proceed directly from block 420 to block 422. In this alternative example, the flow of diagram 400 may proceed from block 420 to block 428 if the busy time was reduced by the migration of the medium-priority queue. Also, the flow of diagram 400 may proceed from block 424 to block 426 if the busy time was reduced by the migration of the high-priority queue. The flow of diagram 400 may then proceed from block 426 to block 428, then from block 428 to block 430.

In other examples, the time at which a queue is migrated back to the source controller can occur at any point after the HBA driver has verified that the queue is not causing the outlier-level busy time.

Figure 5:
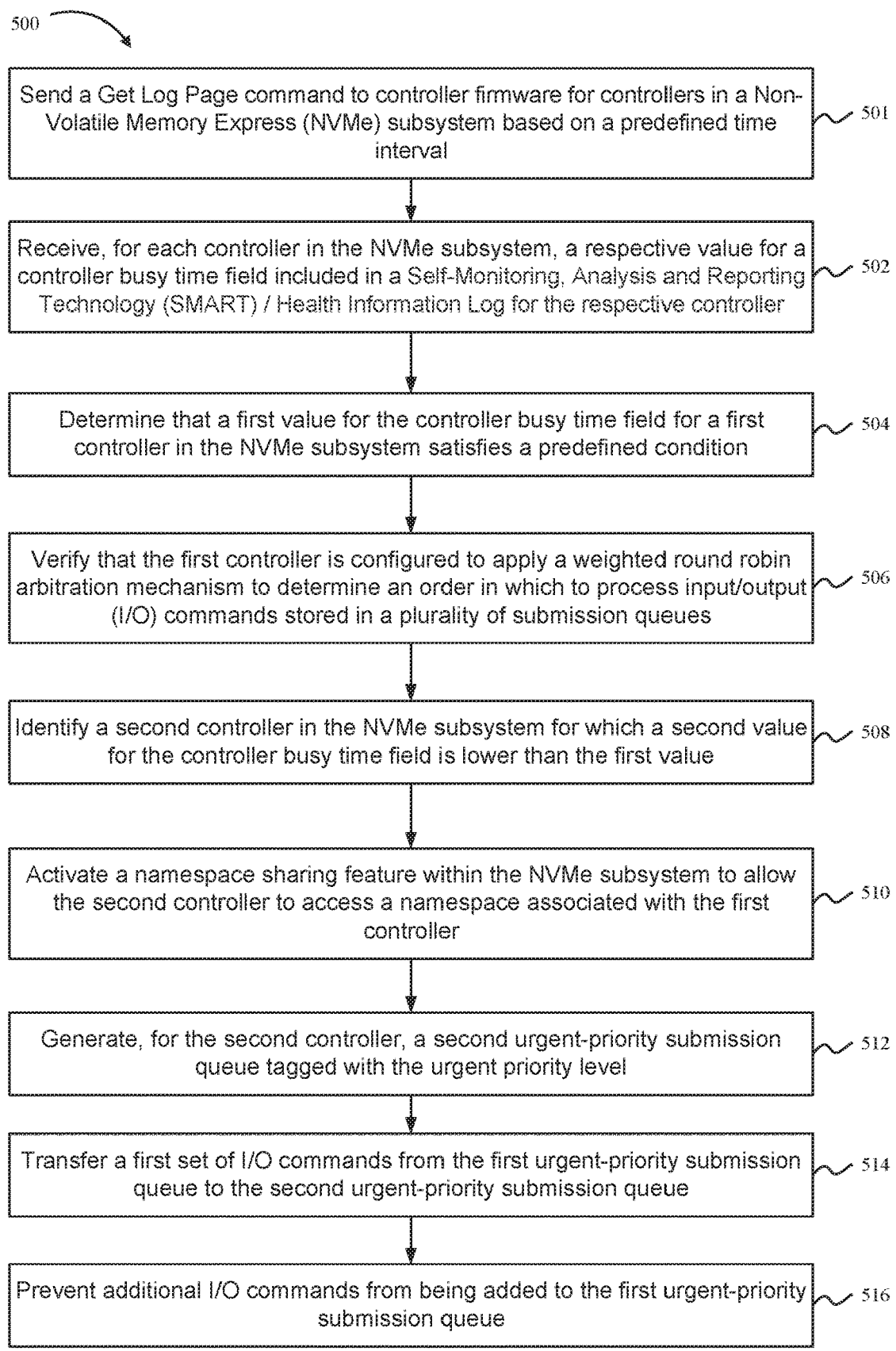
FIG. 5 illustrates functionality for an HBA driver as described herein, according to one example.

FIG. 5 illustrates functionality 500 for an HBA driver as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only eight blocks are shown in the functionality 500, the functionality 500 may include other actions described herein.

As shown in block 501, the functionality 500 includes sending a Get Log Page command to controller firmware for controllers in a Non-Volatile Memory Express (NVMe) subsystem based on a predefined time interval.

As shown in block 502, the functionality 500 includes receiving, for each controller in the NVMe subsystem, a respective value for a controller busy time field included in a Self-Monitoring, Analysis and Reporting Technology (SMART)/Health Information Log for the respective controller. In one example, the unit of measurement for the value is minutes. However, other time units (e.g., seconds or hours) may be used in other examples.

As shown in block 504, the functionality 500 includes determining that a first value for the controller busy time field for a first controller in the NVMe subsystem satisfies a predefined condition. In one example, the predefined condition is that the first value is an outlier relative to the distribution of values for the set of controllers in the NVMe subsystem that apply the weighted round robin arbitration mechanism. To determine whether the first value is an outlier, an HBA driver can determine the first, second, third, and fourth quartiles of the distribution. Next, the HBA driver can determine the interquartile range and multiply the interquartile range by 1.5 to determine a product. The HBA driver can then add the product to the third quartile to determine a sum. If the first value is greater than the sum, the first value is an outlier and the predefined condition is satisfied.

As shown in block 506, the functionality 500 includes verifying that the first controller is configured to apply a weighted round robin arbitration mechanism to determine an order in which to process input/output (I/O) commands stored in a plurality of submission queues. The plurality of submission queues includes a first urgent-priority submission queue tagged with an urgent priority level.

As shown in block 508, the functionality 500 includes identifying a second controller in the NVMe subsystem for which a second value for the controller busy time field is lower than the first value. The second controller does not apply the weighted round robin arbitration mechanism As shown in block 510, the functionality 500 includes activating a namespace sharing feature within the NVMe subsystem to allow the second controller to access a namespace associated with the first controller.

As shown in block 512, the functionality 500 includes generating, for the second controller, a second urgent-priority submission queue tagged with the urgent priority level. The second controller manages the second urgent-priority submission queue, while the first controller manages the first urgent-priority submission queue.

As shown in block 514, the functionality 500 includes transferring a first set of I/O commands from the first urgent-priority submission queue to the second urgent-priority submission queue.

As shown in block 516, the functionality 500 includes preventing additional I/O commands from being added to the first urgent-priority submission queue.

The functionality 500 may also include receiving an updated value for the controller busy time field for the first controller; determining, based on the updated value, that a busy time for the first controller has not yet decreased by a threshold amount; identifying, for the first controller, a first low-priority submission queue tagged with a low priority level; generating, for the second controller, a second low-priority submission queue tagged with the low priority level; and transferring a second set of I/O commands from the first low-priority queue to the second low-priority queue.

The functionality 500 may also include receiving a second updated value for the controller busy time field for the first controller; determining, based on the second updated value, that the busy time for the first controller has not yet decreased by the threshold amount; identifying, for the first controller, a first medium-priority submission queue tagged with a medium priority level; generating, for the second controller, a second medium-priority submission queue tagged with the medium priority level; and transferring a third set of I/O commands from the first medium-priority queue to the second medium-priority queue.

Alternatively, if the second updated value indicates that the busy time for the first controller has decreased by at least the threshold amount, the functionality 500 may include determining, based on the second updated value, that the busy time for the first controller has decreased by at least the threshold amount; transferring the first set of I/O commands from the second urgent-priority submission queue back to the first urgent-priority submission queue; and throttling the second low-priority queue by reducing an arbitration burst value for the second low-priority queue.

The functionality 500 may also include receiving a third updated value for the controller busy time field for the first controller; determining, based on the third updated value, that the busy time for the first controller has not yet decreased by the threshold amount; identifying, for the first controller, a first high-priority submission queue tagged with a high priority level; generating, for the second controller, a second high-priority submission queue tagged with the high priority level; and transferring a fourth set of I/O commands from the first high-priority queue to the second high-priority queue.

Alternatively, if the third updated value indicates that the busy time for the first controller has decreased by at least the threshold amount, the functionality 500 may include: determining, based on the third updated value, that the busy time for the first controller has decreased by at least the threshold amount; transferring the first set of I/O commands from the second urgent-priority submission queue back to the first urgent-priority submission queue; transferring the second set of I/O commands from the second low-priority queue back to the first low-priority queue; and throttling the second medium-priority queue by reducing an arbitration burst value for the second medium-priority queue.

The functionality 500 may also include receiving a fourth updated value for the controller busy time field for the first controller; determining, based on the fourth updated value, that the busy time for the first controller has decreased by at least the threshold amount; transferring the first set of I/O commands from the second urgent-priority submission queue back to the first urgent-priority submission queue; transferring the second set of I/O commands from the second low-priority queue back to the first low-priority queue; and transferring the third set of I/O commands from the second medium-priority queue back to the first medium-priority queue.

The functionality 500 may also include deactivating the namespace sharing feature; and allowing additional I/O commands to be added to the first urgent-priority submission queue after transferring the first set of I/O commands from the second urgent-priority submission queue back to the first urgent-priority submission queue. The functionality 500 may also include throttling the first high-priority queue by reducing an arbitration burst value for the first high-priority queue.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
    sending a Get Log Page command to controller firmware for controllers in a Non-Volatile Memory Express (NVMe) subsystem based on a predefined time interval;
    receiving, for each respective controller in the NVMe subsystem, a respective value for a controller busy time field included in a Self-Monitoring, Analysis and Reporting Technology (SMART)/Health Information Log for the respective controller;
    determining that a first value for the controller busy time field for a first controller in the NVMe subsystem satisfies a predefined condition;
    verifying that the first controller is configured to apply a weighted round robin arbitration mechanism to determine an order in which to process input/output (I/O) commands stored in a plurality of submission queues, wherein the plurality of submission queues includes a first urgent-priority submission queue tagged with an urgent priority level;
    identifying a second controller in the NVMe subsystem for which a second value for the controller busy time field is lower than the first value of the controller busy time field of the first controller, wherein the second controller does not apply the weighted round robin arbitration mechanism;
    activating a namespace sharing feature within the NVMe subsystem to allow the second controller to access a namespace associated with the first controller;
    generating, for the second controller, a second urgent-priority submission queue tagged with the urgent priority level;
    transferring a first set of I/O commands from the first urgent-priority submission queue to the second urgent-priority submission queue; and
    preventing additional I/O commands from being added to the first urgent-priority submission queue.

2. The method of claim 1, further comprising:
    receiving an updated value representing a busy time for the controller busy time field for the first controller;
    determining, based on the updated value, that the busy time for the first controller has not yet decreased by a threshold amount;
    identifying, for the first controller, a first low-priority submission queue tagged with a low priority level;
    generating, for the second controller, a second low-priority submission queue tagged with the low priority level; and
    transferring a second set of I/O commands from the first low-priority queue to the second low-priority queue.

3. The method of claim 2, further comprising:
    receiving a second updated value for the controller busy time field for the first controller;
    determining, based on the second updated value, that the busy time for the first controller has decreased by at least the threshold amount;
    transferring the first set of I/O commands from the second urgent-priority submission queue back to the first urgent-priority submission queue; and
    throttling the second low-priority queue by reducing an arbitration burst value for the second low-priority queue.

4. The method of claim 2, further comprising:
    receiving a second updated value for the controller busy time field for the first controller;
    determining, based on the second updated value, that the busy time for the first controller has not yet decreased by the threshold amount;
    identifying, for the first controller, a first medium-priority submission queue tagged with a medium priority level;
    generating, for the second controller, a second medium-priority submission queue tagged with the medium priority level; and
    transferring a third set of I/O commands from the first medium-priority queue to the second medium-priority queue.

5. The method of claim 4, further comprising:
    receiving a third updated value for the controller busy time field for the first controller;
    determining, based on the third updated value, that the busy time for the first controller has not yet decreased by the threshold amount;
    identifying, for the first controller, a first high-priority submission queue tagged with a high priority level;
    generating, for the second controller, a second high-priority submission queue tagged with the high priority level; and
    transferring a fourth set of I/O commands from the first high-priority queue to the second high-priority queue.

6. The method of claim 5, further comprising:
    receiving a fourth updated value for the controller busy time field for the first controller;
    determining, based on the fourth updated value, that the busy time for the first controller has decreased by at least the threshold amount;
    transferring the first set of I/O commands from the second urgent-priority submission queue back to the first urgent-priority submission queue;
    transferring the second set of I/O commands from the second low-priority queue back to the first low-priority queue; and transferring the third set of I/O commands from the second medium-priority queue back to the first medium-priority queue.

7. The method of claim 6, further comprising:
deactivating the namespace sharing feature; and
allowing additional I/O commands to be added to the first urgent-priority submission queue after transferring the first set of I/O commands from the second urgent-priority submission queue back to the first urgent-priority submission queue.

8. A system comprising:
one or more processors; and
a memory storing instructions that, when executed on the one or more processors, perform a set of actions, the set of actions comprising:
sending a Get Log Page command to controller firmware for controllers in a Non-Volatile Memory Express (NVMe) subsystem based on a predefined time interval,
receiving, for each controller in the NVMe subsystem, a respective value for a controller busy time field included in a Self-Monitoring, Analysis and Reporting Technology (SMART)/Health Information Log for the respective controller,
determining that a first value for the controller busy time field for a first controller in the NVMe subsystem satisfies a predefined condition,
verifying that the first controller is configured to apply a weighted round robin arbitration mechanism to determine an order in which to process input/output (I/O) commands stored in a plurality of submission queues, wherein the plurality of submission queues includes a first urgent-priority submission queue tagged with an urgent priority level,
identifying a second controller in the NVMe subsystem for which a second value for the controller busy time field is lower than the first value of the controller busy time field of the first controller, wherein the second controller does not apply the weighted round robin arbitration mechanism,
activating a namespace sharing feature within the NVMe subsystem to allow the second controller to access a namespace associated with the first controller,
generating, for the second controller, a second urgent-priority submission queue tagged with the urgent priority level,
transferring a first set of I/O commands from the first urgent-priority submission queue to the second urgent-priority submission queue, and
preventing additional I/O commands from being added to the first urgent-priority submission queue.

9. The system of claim 8, wherein the set of actions further comprises:
receiving an updated value representing a busy time for the controller busy time field for the first controller;
determining, based on the updated value, that the busy time for the first controller has not yet decreased by a threshold amount;
identifying, for the first controller, a first low-priority submission queue tagged with a low priority level;
generating, for the second controller, a second low-priority submission queue tagged with the low priority level; and
transferring a second set of I/O commands from the first low-priority queue to the second low-priority queue.

10. The system of claim 9, wherein the set of actions further comprises:
receiving a second updated value for the controller busy time field for the first controller;
determining, based on the second updated value, that the busy time for the first controller has decreased by at least the threshold amount;
transferring the first set of I/O commands from the second urgent-priority submission queue back to the first urgent-priority submission queue; and
throttling the second low-priority queue by reducing an arbitration burst value for the second low-priority queue.

11. The system of claim 9, wherein the set of actions further comprises:
receiving a second updated value for the controller busy time field for the first controller;
determining, based on the second updated value, that the busy time for the first controller has not yet decreased by the threshold amount;
identifying, for the first controller, a first medium-priority submission queue tagged with a medium priority level;
generating, for the second controller, a second medium-priority submission queue tagged with the medium priority level; and
transferring a third set of I/O commands from the first medium-priority queue to the second medium-priority queue.

12. The system of claim 11, wherein the set of actions further comprises:
receiving a third updated value for the controller busy time field for the first controller;
determining, based on the third updated value, that the busy time for the first controller has not yet decreased by the threshold amount;
identifying, for the first controller, a first high-priority submission queue tagged with a high priority level;
generating, for the second controller, a second high-priority submission queue tagged with the high priority level; and
transferring a fourth set of I/O commands from the first high-priority queue to the second high-priority queue.

13. The system of claim 12, wherein the set of actions further comprises:
receiving a fourth updated value for the controller busy time field for the first controller;
determining, based on the fourth updated value, that the busy time for the first controller has decreased by at least the threshold amount;
transferring the first set of I/O commands from the second urgent-priority submission queue back to the first urgent-priority submission queue;
transferring the second set of I/O commands from the second low-priority queue back to the first low-priority queue; and
transferring the third set of I/O commands from the second medium-priority queue back to the first medium-priority queue.

14. The system of claim 13, wherein the set of actions further comprises:
deactivating the namespace sharing feature; and
allowing additional I/O commands to be added to the first urgent-priority submission queue after transferring the first set of I/O commands from the second urgent-priority submission queue back to the first urgent-priority submission queue.

15. A non-transitory computer-readable storage medium containing instructions thereon that, when executed on a processor, perform the following:
 sending a Get Log Page command to controller firmware for controllers in a Non-Volatile Memory Express (NVMe) subsystem based on a predefined time interval;
 receiving, for each controller in the NVMe subsystem, a respective value for a controller busy time field included in a Self-Monitoring, Analysis and Reporting Technology (SMART)/Health Information Log for the respective controller;
 determining that a first value for the controller busy time field for a first controller in the NVMe subsystem satisfies a predefined condition;
 verifying that the first controller is configured to apply a weighted round robin arbitration mechanism to determine an order in which to process input/output (I/O) commands stored in a plurality of submission queues, wherein the plurality of submission queues includes a first urgent-priority submission queue tagged with an urgent priority level;
 identifying a second controller in the NVMe subsystem for which a second value for the controller busy time field is lower than the first value of the controller busy time field of the first controller, wherein the second controller does not apply the weighted round robin arbitration mechanism;
 activating a namespace sharing feature within the NVMe subsystem to allow the second controller to access a namespace associated with the first controller;
 generating, for the second controller, a second urgent-priority submission queue tagged with the urgent priority level;
 transferring a first set of I/O commands from the first urgent-priority submission queue to the second urgent-priority submission queue; and
 preventing additional I/O commands from being added to the first urgent-priority submission queue.

16. The non-transitory computer-readable storage medium of claim 15, further comprising instructions thereon that, when executed on the processor, perform the following:
 receiving an updated value representing a busy time for the controller busy time field for the first controller;
 determining, based on the updated value, that the busy time for the first controller has not yet decreased by a threshold amount;
 identifying, for the first controller, a first low-priority submission queue tagged with a low priority level;
 generating, for the second controller, a second low-priority submission queue tagged with the low priority level; and
 transferring a second set of I/O commands from the first low-priority queue to the second low-priority queue.

17. The non-transitory computer-readable storage medium of claim 16, further comprising instructions thereon that, when executed on the processor, perform the following:
 receiving a second updated value for the controller busy time field for the first controller;
 determining, based on the second updated value, that the busy time for the first controller has not yet decreased by the threshold amount;
 identifying, for the first controller, a first medium-priority submission queue tagged with a medium priority level;
 generating, for the second controller, a second medium-priority submission queue tagged with the medium priority level; and
 transferring a third set of I/O commands from the first medium-priority queue to the second medium-priority queue.

18. The non-transitory computer-readable storage medium of claim 17, further comprising instructions thereon that, when executed on the processor, perform the following:
 receiving a third updated value for the controller busy time field for the first controller;
 determining, based on the third updated value, that the busy time for the first controller has not yet decreased by the threshold amount;
 identifying, for the first controller, a first high-priority submission queue tagged with a high priority level;
 generating, for the second controller, a second high-priority submission queue tagged with the high priority level; and
 transferring a fourth set of I/O commands from the first high-priority queue to the second high-priority queue.

19. The non-transitory computer-readable storage medium of claim 18, further comprising instructions thereon that, when executed on the processor, perform the following:
 receiving a fourth updated value for the controller busy time field for the first controller;
 determining, based on the fourth updated value, that the busy time for the first controller has decreased by at least the threshold amount;
 transferring the first set of I/O commands from the second urgent-priority submission queue back to the first urgent-priority submission queue;
 transferring the second set of I/O commands from the second low-priority queue back to the first low-priority queue; and
 transferring the third set of I/O commands from the second medium-priority queue back to the first medium-priority queue.

20. The non-transitory computer-readable storage medium of claim 19, further comprising instructions thereon that, when executed on the processor, perform the following:
 deactivating the namespace sharing feature; and
 allowing additional I/O commands to be added to the first urgent-priority submission queue after transferring the first set of I/O commands from the second urgent-priority submission queue back to the first urgent-priority submission queue.

* * * * *